J. L. PRITCHARD.
IRRIGATION PLANT.
APPLICATION FILED MAR. 22, 1912.
1,058,464.
Patented Apr. 8, 1913.
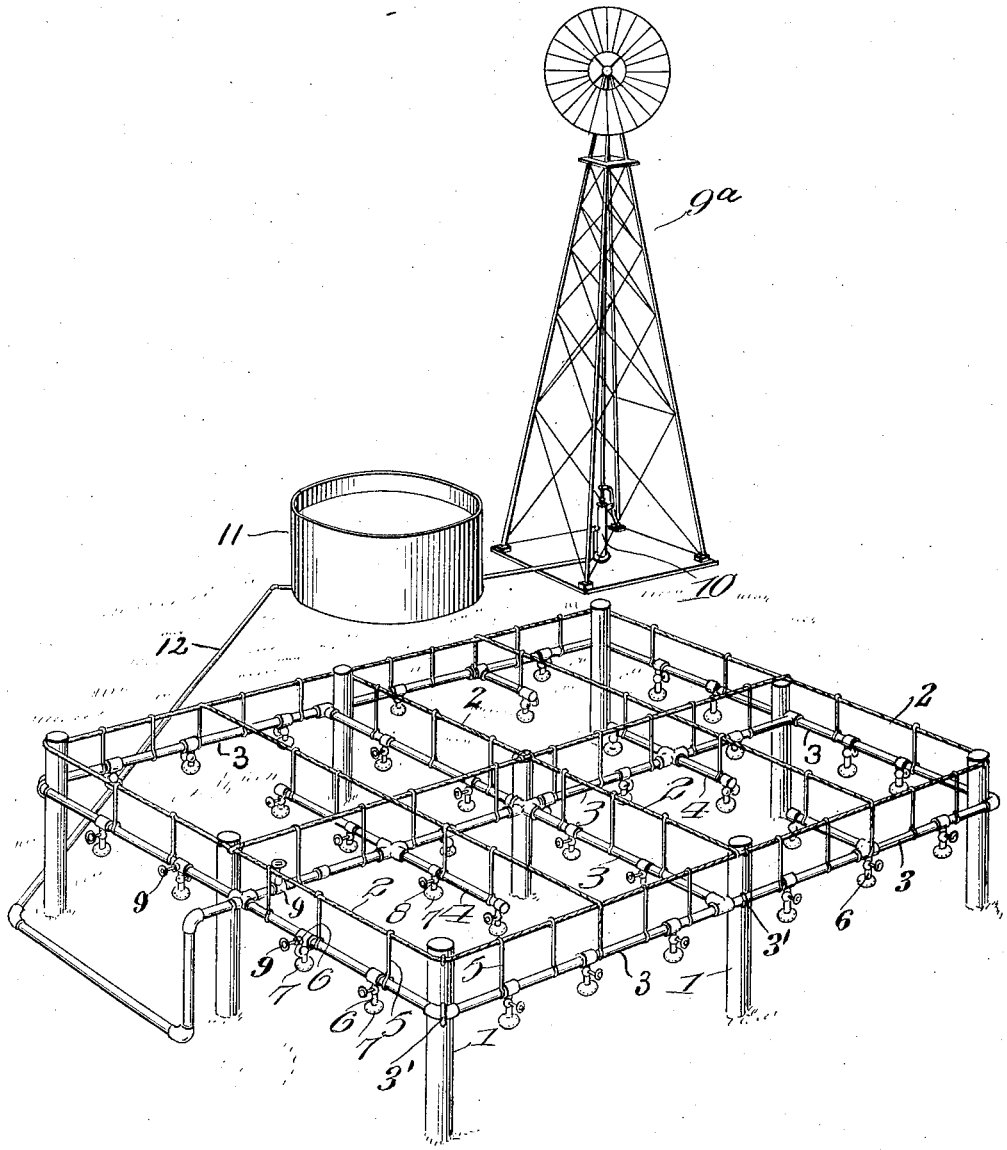
Witnesses
M. H. Slifer.
V. B. Hillyard,
Inventor
Joseph L. Pritchard
By Victor J. Evans
Attorney

UNITED STATES PATENT OFFICE.

JOSEPH L. PRITCHARD, OF OKLAHOMA, OKLAHOMA.

IRRIGATION PLANT.

1,058,464.  Specification of Letters Patent.  Patented Apr. 8, 1913.

Application filed March 22, 1912. Serial No. 685,438.

*To all whom it may concern:*

Be it known that I, JOSEPH L. PRITCHARD, a citizen of the United States, residing at Oklahoma city, in the county of Oklahoma and State of Oklahoma, have invented new and useful Improvements in Irrigation Plants, of which the following is a specification.

The invention provides means of irrigation for distributing water in sprays or jets from above instead of leading the same through ditches or trenches, thereby moistening the body of the plants as well as the roots.

In carrying out the invention a plurality of pipes are supported a distance above the ground and are supplied with spray nozzles, each nozzle being provided with a cut-off so that any one or more of the nozzles may be closed when for one reason or another it is not desired to have the same discharge water.

The invention contemplates posts or like supports located at proper intervals in the ground to be irrigated. Cables are supported upon the upper ends of the posts. Water pipes are connected to the posts and are suspended from the cables by means of struts or hangers. Branch pipes have connection with the main lead pipes and the several pipes are supplied with spray nozzles, the latter being attached to short pipes which are connected to the main pipes, each of the short pipes having a cock to admit of cutting off the supply of water to the spray nozzle.

The invention consists of the novel features, details of construction and combination of parts, which hereinafter will be more particularly set forth, claimed, and illustrated in the accompanying drawing, which is a perspective view of an irrigating system or plant embodying the invention.

The plot of ground to be irrigated is supplied with posts 1, which are set in openings formed therein. Cables 2 are attached to the upper ends of the posts. These cables extend longitudinally and transversely of the plot of ground to be irrigated and serve as supporting means for distributing pipes. Pipes 3 are connected by staples 3' or other fastening means to the posts and serve to distribute the water. Branch pipes 4 have connection with the main lead pipes 3 and receive a supply of water therefrom. Struts or hangers 5 connect the several pipes with the cables 2 and serve to support the pipes from the overhead cables. Short pipes 6 are pendent from the main and branch pipes and are provided at their lower ends with spray nozzles 7. A cock 8 is located in the length of each of the pipes 6 to enable the water to be cut off from the spray nozzles or to be supplied thereto in regulated quantity. The main and branch pipes are so arranged as to supply water to every part of the ground to be irrigated and the spray nozzles are so arranged that when the water is discharged therefrom every part of the field to be irrigated is uniformly dampened. Cocks 9 are located near the receiving ends of the lead pipes 3 to admit of shutting off or regulating the supply of water thereto.

The water for irrigating purposes may be obtained from a stream, well, creek, cistern, or lake and may be supplied under such a head as to insure the supply passing to every part of the distributing pipes. It is to be understood that the water may be supplied by means of a ram, pump, or other appliance and as indicated a windmill $9^a$ is had to utilize the force of air currents, said windmill being conveniently positioned and arranged to operate a pump 10 which may draw the water from a well, creek, spring or other source of supply and force the same into a tank 11 from which the water is led by means of a pipe 12 to the distributing pipes 3 and 4.

Having thus described the invention what is claimed as new, is:—

An irrigating system comprising longitudinal and transverse rows of posts set in the ground and inclosing the plot to be irrigated, main longitudinal and transverse cables attached to the upper ends of the posts, main outer longitudinal and transverse distributing pipes attached to the posts a short distance below the cables, struts between the main cables and main distributing pipes, central longitudinal and transverse main distributing pipes connected with each other and with said outer longitudinal and transverse main distributing pipes, other transverse cables connected with the longitudinal cables on lines between the posts, branch pipes having respective connection with the outer longitudinal distributing pipes, other branch pipes respectively connected with the central longitudinal, distributing pipe, struts connecting the branch pipes with the second named transverse cables, short pipes pendent from the main and branch pipes and having spray nozzles at their lower ends, cocks in the length of the short pipes, and means for supplying water under pressure to the several pipes.

In testimony whereof I affix my signature in presence of two witnesses.

JOSEPH L. PRITCHARD.

Witnesses:
GEORGE A. SUESS,
J. B. GREAT.

Copies of this patent may be obtained for five cents each, by addressing the "Commissioner of Patents, Washington, D. C."